April 6, 1926.
LA VERNE C. ENGLAND
AUTOMATIC BRAKE MECHANISM
Filed April 12, 1923   2 Sheets-Sheet 1
1,579,292
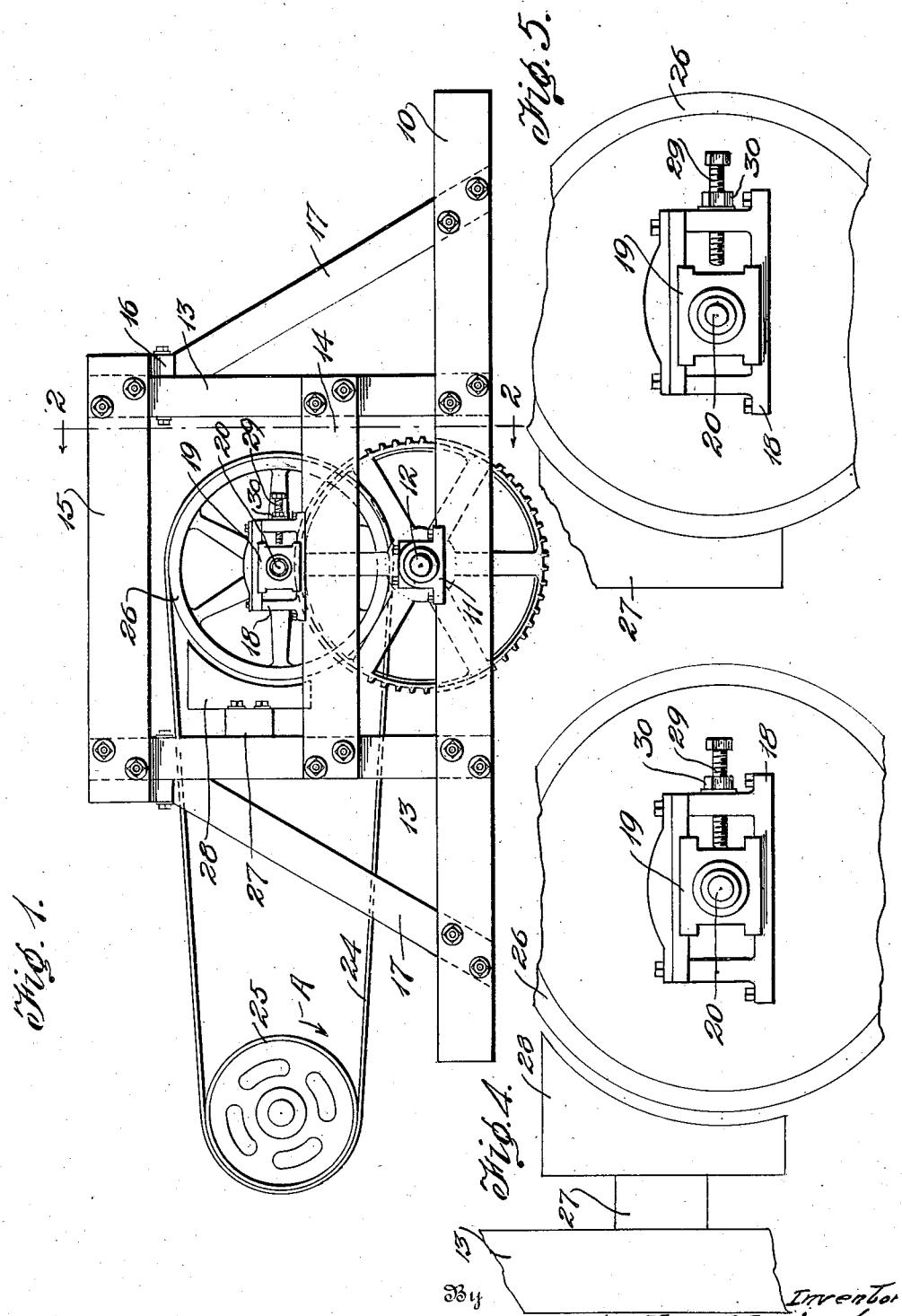

April 6, 1926.
LA VERNE C. ENGLAND
AUTOMATIC BRAKE MECHANISM
Filed April 12, 1923  2 Sheets-Sheet 2
1,579,292
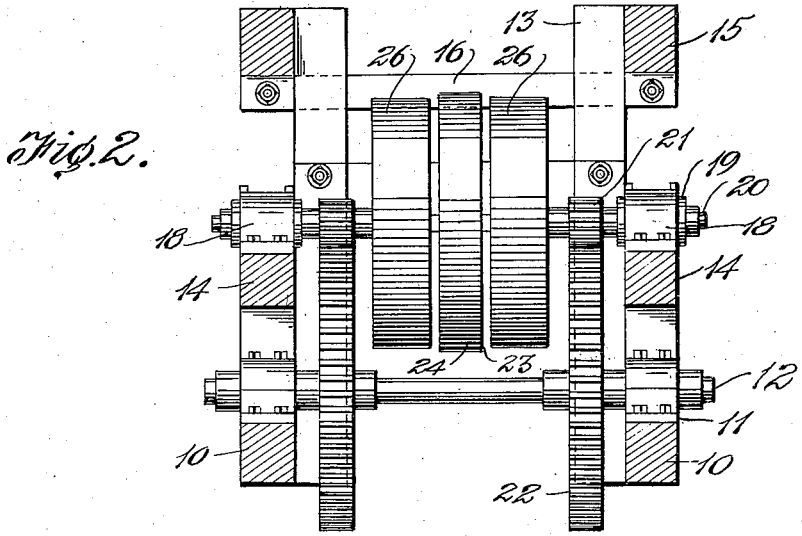
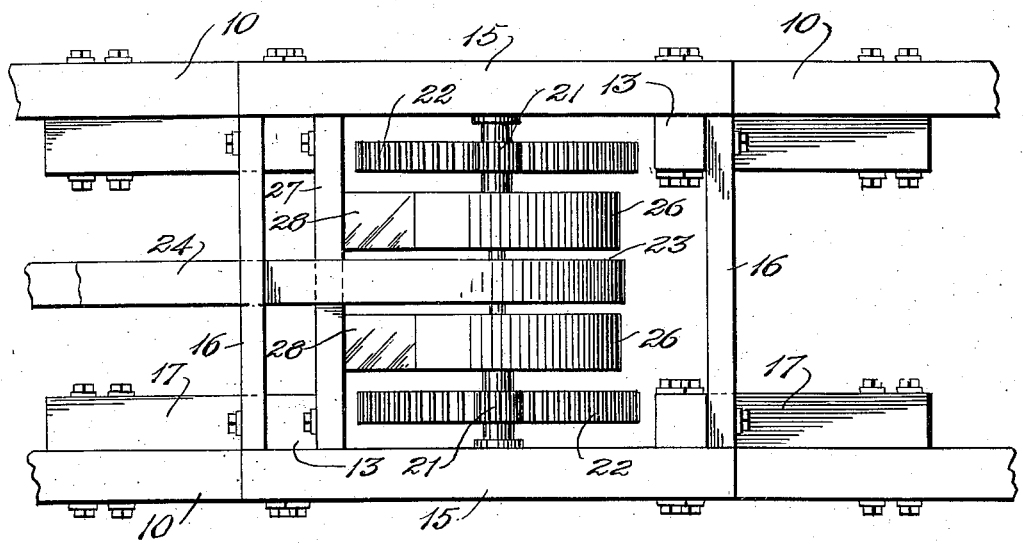
Inventor
La Verne C. England
By
Attorneys Patented Apr. 6, 1926.

1,579,292

UNITED STATES PATENT OFFICE.

LA VERNE C. ENGLAND, OF FAIRMONT, WEST VIRGINIA, ASSIGNOR TO FAIRMONT MINING MACHINERY COMPANY, OF FAIRMONT, WEST VIRGINIA.

AUTOMATIC BRAKE MECHANISM.

Application filed April 12, 1923. Serial No. 631,730.

*To all whom it may concern:*

Be it known that I, LA VERNE C. ENGLAND, a citizen of the United States, residing at Fairmont, in the county of Marion and State of West Virginia, have invented certain new and useful Improvements in Automatic Brake Mechanism, of which the following is a specification.

This invention relates to conveying apparatus, for conveying materials of any kind down an incline, and has special reference to an automatic brake for such apparatus.

In the conveying of materials down an incline it occasionally happens that the load is sufficient to develop power. The effect of this development of power is to cause a sudden speeding up of the engine or motor driving the conveyor, and at times this sudden speeding up occurs so quickly as to prevent the action of the governing mechanism of the engine or motor so that the engine or motor races, allowing the conveyor to "run away", and this is apt to create damage to itself and in some instances, by the breakage of parts, to objects and persons around the conveyor.

Various attempts have been made to overcome this racing of the engine or motor by the application of brakes, and these attempts have resulted in the provision of complicated devices arranged to apply the brakes, such devices being difficult to maintain in proper working condition, as well as expansive to install and uncertain in effect.

The present invention contemplates and has for its principal object, the provision of a very simple, automatically operated braking device which will instantly operate whenever there is any tendency on the part of the conveyor to develop power or "run away", and which is of such character that there are no moving parts to get out of order, such few parts as there are being of very economical and simple construction.

Furthermore, this invention provides absolute protection against damage that might otherwise occur should the source of power suddenly cease, or the driving belt come off the pulleys or brake, at such time when the conveyor may be developing power.

The effectiveness of this invention in no wise depends on the driving engine or motor, the braking effect coming directly back through the driving gears.

Protection against damage in the event of the driving gears being broken is taken care of by the use of double sets of gears, should one set become broken the other set will handle the load until repairs can be made. The complete driving mechanism would have to collapse before destroying the effect of the brake which is highly improbable.

A second important object of this invention is to provide a simple and improved arrangement of braking means which will automatically brake the mechanism upon the load being released, and will automatically release from braking position upon the load being again applied so that no manual attendance is necessary to release such brakes.

With the above and other objects in view, as will be hereinafter apparent, the invention consists in general of certain novel details of construction and combinations of parts hereinafter fully described, illustrated in the accompanying drawings and specifically claimed.

In the accompanying drawings like characters of reference indicate like parts in the several views, and:

Fig. 1 is a side elevation of the improved mechanism.

Fig. 2 is a section on the line 2—2 of Figure 1.

Fig. 3 is a plan view of the mechanism.

Fig. 4 is an enlarged detail view showing certain parts of the device, including the brake drum and brake, in released position.

Fig. 5 is a view similar to Figure 4, but showing the parts in braking position.

In the embodiment of the invention herein shown, which may be taken as one of many such embodiments, there is disclosed a supporting frame having bottom horizontal members 10, on which are mounted alined bearings 11 supporting the driven shaft 12 to which the load is applied. It has not been deemed necessary in the present instance to show a drum or other means for applying the load, as such specific means does not form a definite part of the invention. Extending upward from the frame members 10 are vertical frame members 13, and on each side of the frame these vertical frame members are connected by a horizontal frame member 14. The vertical frame members may also be tied together by longitudinal members 15 and transverse members 16, and may be braced to the members 10 by the diagonal braces 17. Mounted on each of the horizontal frame members 14 directly above the bearings 11 are housings 18 wherein are slidably mounted journalled boxes or bearings 19 carrying the driving shaft 20. This driving shaft 20 has fixed thereon a pair of pinions 21 which mesh with the gears 22 fixed on the shaft 12.

Furthermore there is provided on the shaft 20 a belt pulley 23 around which is trained the belt 24, which also passes around the driving pulley 25 on a suitable actuating engine or motor (not shown). Also mounted fixedly on the shaft 20 is a pair of brake drums 26. Connecting the two vertical frame members 13 which lie nearer the engine or motor is a transverse member 27 supporting a pair of brake shoes 28 against which the brake drums 26 may engage upon movement of the bearings 19 in the direction of such brake shoes. For the purpose of making clear the operation of the device, movement of the bearings toward the engine or motor will be referred to as rearward movement, and movement in the opposite direction will be referred to as forward movement. In order to limit such forward movement, stop screws 29 are threaded through the forward sides of the housings 18, and are located in adjusted position by means of lock nuts 30.

In the operation of the device the engine or motor pulley revolves in the direction of the arrow A, shown in Fig. 1. This puts a tension on the lower run of the belt 24, this being in accordance with good engineering practice. With the engine running, if rotation of the shaft 12 is resisted by a load of any sort then the pinions 21 will tend to move forwardly over the gears 22, as though the latter were a stationary rack. In actual practice, this forward movement continues a fraction of an inch until the bearings 19 engage against the stop screws or bolts 29. This is the normal condition of the mechanism. If now for any reason the load on the shaft 12 be suddenly released, causing it to run above normal speed, then the above action is reversed, the reaction of the gears 22 running above normal speed against the pinions 21 forces the driving shaft 20 rearward with the slidable bearings 19, since there is no practical hindrance to the revolution of the gears 22, and the revolution of the pinions 21 is controlled by the speed of the engine or motor.

By consequence of this rearward movement, the brake drums 26 are brought into close contact with the brake shoes 28, and braking effect is at once applied to the shaft 20 which prevents the running away or speeding up of the conveyor since the more tendency there is to run away or speed up, the greater the reaction will be on the shaft 20, and in consequence, the greater will be the braking effect of the drums 26 against the brake shoes 28. If this release of load is only momentary, or if power is required again within a short time from the engine or motor, then the action of the driving pinion on the gear 22 will again be similar to that of a gear on a fixed rack and the brake drums 26 will move forwardly with shaft 20, thus freeing these drums from the brake shoes and permitting free revolution of the shaft 20 so far as the action of the brakes is concerned.

Engineers and others skilled in the art will readily understand that changes may be made in the exact form and arrangement of the various parts of the mechanism while still maintaining the essential principles involved. It is not, therefore, desired to confine the invention to the exact form herein shown and described, but it is intended to include all such as properly come within the scope claimed.

Having thus described the invention, what is claimed as new, is:

1. In a device of the kind described, a driving shaft, a driven shaft, one of said shafts being supported for bodily lateral movement, such bodily lateral movement being effected in one direction by the application of power to the movable shaft and in the other direction by the application of load resistance to said shaft, a brake drum on said movable shaft, and a brake shoe fixed in position to be engaged by the brake drum upon release of load from the movable shaft.

2. In a device of the kind described, a pair of fixedly positioned alined bearings, a driven shaft supported therein, a driving shaft arranged parallel to the driven shaft, bearings supporting said driving shaft and movable so as to keep the driving shaft in substantial parallelism to the driven shaft, a driving gear on said driving shaft, a gear on said driven shaft meshing with the driving gear, a brake drum on the driving shaft, means to rotate said driving shaft and arranged to cause forward movement of the driving shaft upon application of a load to the driven shaft, and to cause rearward movement of the driving shaft upon release of load from the driven shaft, and a brake shoe fixedly supported rearwardly of said brake drum to engage the same upon rearward movement of the driving shaft.

3. In a device of the kind described, a pair of fixedly positioned alined bearings, a driven shaft supported therein, a driving shaft arranged parallel to the driven shaft, bearings supporting said driving shaft and movable so as to keep the driving shaft in substantial parallelism to the driven shaft, a driving gear on said driving shaft, a gear on said driven shaft meshing with the driving gear, a brake drum on the driving shaft, a belt pulley on said driving shaft, a driving belt pulley located rearwardly of the driving shaft, a belt engaging said belt pulleys, said driving belt pulley being arranged to revolve in such direction that the portion of the belt adjacent the driven shaft moves toward the driving belt pulley, and a brake shoe fixed in position rearwardly of the brake drum and adapted to be engaged thereby upon rearward movement of the driving shaft.

4. In a device of the kind described, a pair of alined fixed bearings, a driven shaft journalled in said bearings, a driving shaft arranged parallel to said driven shaft, a pair of bearings supporting said driving shaft, a pair of housings wherein said bearings are slidably mounted to permit bodily movement of the driving shaft while maintaining it substantially parallel to the driven shaft, a driving pinion on said driving shaft, a driven gear meshing with the driving pinion and fixed on the driven shaft, a belt pulley on the driving shaft, a driving belt pulley spaced from the driving shaft, a pulley connecting said belt pulleys, the line connecting the centers of the belt pulleys being substantially at right angles to the line connecting the centers of the shafts, a brake drum on the driving shaft, and a brake fixed in position between said driving shaft and the driving belt pulley, said driving belt pulley being arranged to rotate under load in such a direction as to apply tension to the run of the belt nearer the driven shaft.

5. In a device of the kind described, a frame including a pair of lower horizontal members and a pair of upper horizontal members, alined bearings fixed on the lower horizontal members, a driven shaft supported in said alined bearings, a pair of housings each supported on one of the upper horizontal members directly above the bearing on said member, sliding bearings mounted in said housings to move longitudinally and horizontally therein, stop screws to limit the movement of said bearings in forward direction, a driving shaft supported in the sliding bearings, a driving pinion on said driving shaft, a driven gear on said driven shaft meshing with said pinion, a belt pulley on said driving shaft, a driving belt pulley adjacent said frame, a belt connecting said pulleys, said driving belt pulley revolving under load condition in such direction as to tension the lower run of said belt, a brake drum fixed on the driving shaft, and a brake shoe fixed to said frame and mounted adjacent the brake drum at the rear thereof.

In testimony whereof, I hereunto affix my signature.

LA VERNE C. ENGLAND.